(12) United States Patent
Curry

(10) Patent No.: US 6,842,541 B2
(45) Date of Patent: Jan. 11, 2005

(54) ADAPTIVE COLOR SUPER RESOLUTION THRESHOLDING

(75) Inventor: Donald J. Curry, Menlo Park, CA (US)

(73) Assignee: Xerox Corporation, Stamford, CT (US)

(*) Notice: Subject to any disclaimer, the term of this patent is extended or adjusted under 35 U.S.C. 154(b) by 644 days.

(21) Appl. No.: 09/682,912

(22) Filed: Oct. 31, 2001

(65) Prior Publication Data

US 2003/0081828 A1 May 1, 2003

(51) Int. Cl.[7] ................................................. G06K 9/38
(52) U.S. Cl. ....................... 382/270; 382/272; 382/273
(58) Field of Search ................................. 382/162, 167, 382/270, 272, 273, 274; 358/322, 465, 466

(56) References Cited

U.S. PATENT DOCUMENTS

| 4,442,544 A | 4/1984 | Moreland et al. |
|---|---|---|
| 4,468,704 A | 8/1984 | Stoffel et al. |
| 5,517,335 A * | 5/1996 | Shu ............................. 358/518 |
| 5,778,092 A | 7/1998 | MacLeod et al. |
| 6,243,499 B1 | 6/2001 | Loce et al. |
| 6,731,800 B1 * | 5/2004 | Barthel et al. .............. 382/176 |

* cited by examiner

Primary Examiner—Phuoc Tran
(74) Attorney, Agent, or Firm—Oliff & Berridge, PLC

(57) ABSTRACT

Methods and systems for adaptively thresholding color image pixels are based on determining a signed (e.g., a plus or minus sign) single-component gray image which can be supersampled and binarized. The method computes the distance of a given color image pixel from an idealized plane which segments the color space into two regions. The process is made adaptive by making the threshold a function of neighborhood pixels. This combines the information from all color channels, such as, for example, 3 or 4 color channels, into a high quality gray channel used for binarization.

9 Claims, 6 Drawing Sheets

ADAPTIVE COLOR SUPER RESOLUTION THRESHOLDING

BACKGROUND OF THE INVENTION

1. Field of Invention

This invention pertains to micro-adaptive thresholding of a color image.

2. Description of Related Art

U.S. Pat. No. 4,442,544 to Moreland et al., incorporated herein by reference in its entirety, discloses a micro-adaptive thresholder for processing image pixels. As discussed in the '544 patent, a portion or block of one or more image pixel lines is examined. The maximum and minimum pixel density of the examined portion or block is determined. The difference between the maximum and minimum pixel density in the portion or block is then determined. That difference is multiplied by a predetermined constant, which represents a desired change in threshold level, to provide a base threshold. The base threshold is differenced from the maximum pixel density to provide an optimum threshold.

U.S. Pat. No. 5,778,092 to MacLeod, et al., incorporated herein by reference in its entirety, discloses a technique for compressing a color or gray scale pixel map representing a document. The '092 patent uses a thresholding technique by generating a bitmap of binary values. The thresholding process is adaptive and is based on the pixel values in a local neighborhood around a target pixel. The process, shown in FIGS. 6A and 6B of the '092 patent, involves generating a sum of all pixels which differ in density by a certain maximum value. An average value of all the pixel intensities (or densities) that contributed to the maximum difference is then found. This average value of maximum pixel intensity (or density) difference is used as the threshold.

SUMMARY OF THE INVENTION

The thresholding methods and systems disclosed in the '544 and '092 patents do not take into consideration the chromaticity characteristics of colored image pixels in any significant manner. However, many color images contain portions, such as, for example, edges, which are not properly binarized by the techniques disclosed in the '544 and '092 patents. This occurs because the thresholding systems and methods of the '544 and '092 patents only use luminance, brightness, density values or some approximation of these values, such as, for example, L in the L*,a*,b* color specification system, Y in the X,Y,Z color specification system, or Y in the CMYK color specification system, as the gray reference. However, the edge portions may often be expressed mostly as a chrominance change, rather than a luminance, brightness or density change.

This invention provides systems and methods that combine the information from all color channels to produce a high quality gray channel to be used for binarization.

This invention separately provides systems and methods that generate an adaptive threshold based on a pixel values derived from three-component or four-component color pixel information.

In one exemplary embodiment, this is accomplished by determining a single-component gray pixel value based on three-component or four-component color pixel information to provide an adaptive threshold for image processing color pixel information.

These and other features and advantages of the invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

This invention provides systems and methods for thresholding image pixels in general, and in particular for adaptively thresholding image pixels in response to changes in color content of an image.

This invention describes systems and methods of incorporating information from the color components of an image, such as three tristimulus values, or three tristimulus values and an achromatic value, such as, for example, black, and using an adaptive threshold to produce a single-component high quality gray signed image. This single-component high quality gray signed image can then be supersampled and binarized by comparing the sampled values to zero. Various systems and methods according to this invention determine the distance of a given pixel in a color space defined in terms of the color components, or coordinates derived from the color components, from an idealized sector plane which segments the color space into two regions.

The sector plane may be created for mixed raster content or simply a binary image for facsimile by binarizing an image. Binarizing an image involves comparing each pixel to a threshold and producing a 1 if the pixel's density or luminance or brightness equals or exceeds the threshold density, luminance or brightness, and producing a 0 otherwise. Moreover, because a color source image has multiple bits per pixel, such as, for example, 8 bits per pixel, useful higher resolution images can be produced by scaling up the gray image prior to thresholding. Typically, bilinear interpolation is used to produce the higher resolution gray image. The process is made adaptive by making the threshold a function of the neighborhood pixels, such as, for example, making the threshold an average of the maximum and minimum density, luminance or brightness of the neighboring pixels.

Figure 1:
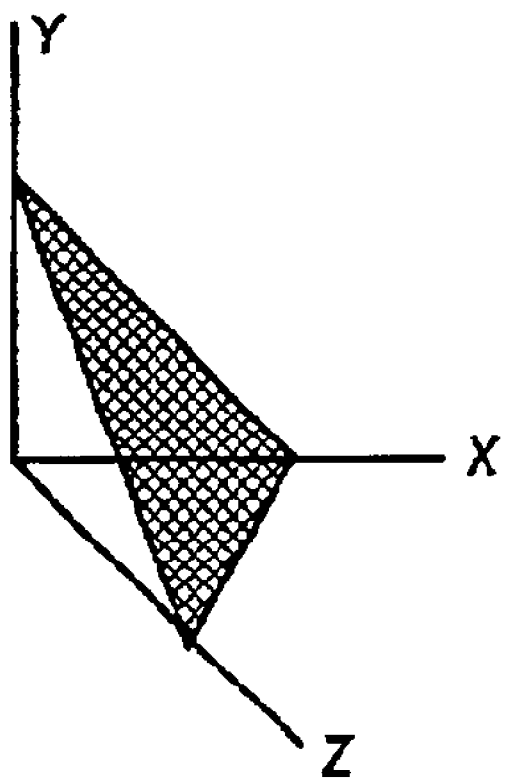
FIG. 1 depicts a conventional color coordinate specification system.
Figure 2:
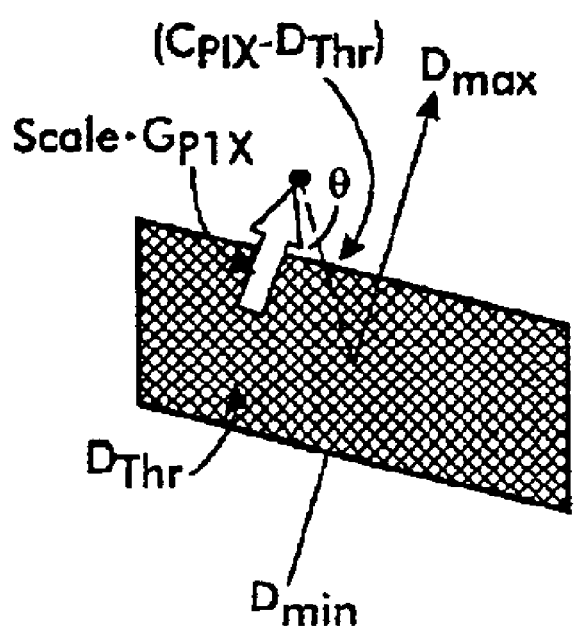
FIG. 2 depicts a number of image pixel vector quantities used to determine an adaptive threshold in the color space illustrated in FIG. 1.

Color images typically have three color components (e.g., X,Y,Z) or four color components (e.g., C,M,Y,K) and may have fewer or more color components. FIGS. 1 and 2 show one example of a color coordinate system which defines a color space. FIG. 1 is a perspective view of the CIE 1931 XYZ tristimulus color space. Each tristimulus value (X,Y, or Z) corresponds to a primary color which can be used to describe a color located in the XYZ color space. The shaded triangle is a plane which is defined by the equation X+Y+Z=1. FIG. 2 shows a portion of the shaded triangle. The X and Y tristimulus values in the shaded triangle plane are x and y chromaticity coordinates, where x=X/(X+Y+Z) and y=Y/(0X+Y+Z).

The systems and methods according to this invention allow the information from the color channels to be meaningfully combined to produce a high quality gray channel to be used for binarization. The characteristics of the color channels may be specified in any known or later-developed color space, such as, for example, the color space defined by the CIE 1931 color specification system. FIG. 2 shows parameters used in this invention in a given color space. The dependent maximum, $D_{max}$, is the pixel value in the local neighborhood which has the highest luminance. Luminance is also referred to conventionally as lightness, brightness, or value. The dependent minimum, $D_{min}$ is the pixel value in the local neighborhood which has the lowest luminance. $D_{max}$ and $D_{min}$ are three-component vectors. For example, where each vector $D_{max}$ and $D_{min}$ has an x, y and z component in the XYZ color space. Any particular color specification system may be used. Certain color specification systems are particularly convenient, in that, in these certain color specification systems, the maximum luminance can be found by examining only one component, i.e., the luminance (e.g., the value, lightness or brightness).

Figure 3:
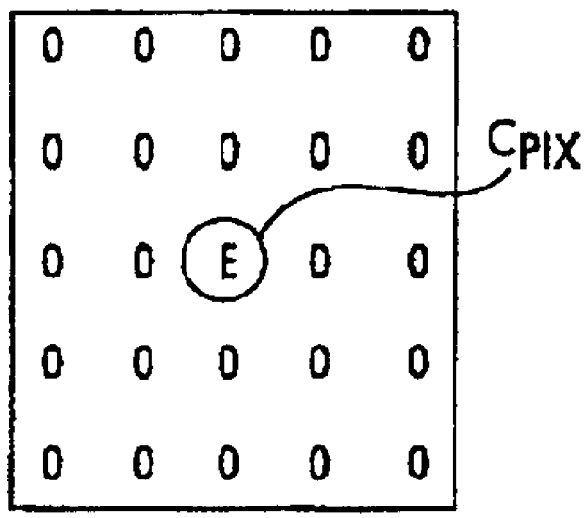
FIG. 3 depicts an image pixel neighborhood including the central pixel in the neighborhood.

The systems and methods of this invention establish a pixel neighborhood or image portion or block. In various exemplary embodiments of the systems and methods of this invention, this image pixel neighborhood, image portion or block is a 5×5 pixel window. This exemplary embodiment is shown in FIG. 3. It should be understood that a one-dimensional pixel neighborhood could be selected, or a smaller or larger two-dimensional neighborhood could be selected, or a three-dimensional pixel neighborhood could be selected, depending on the characteristics of the image being sampled.

Figure 4:
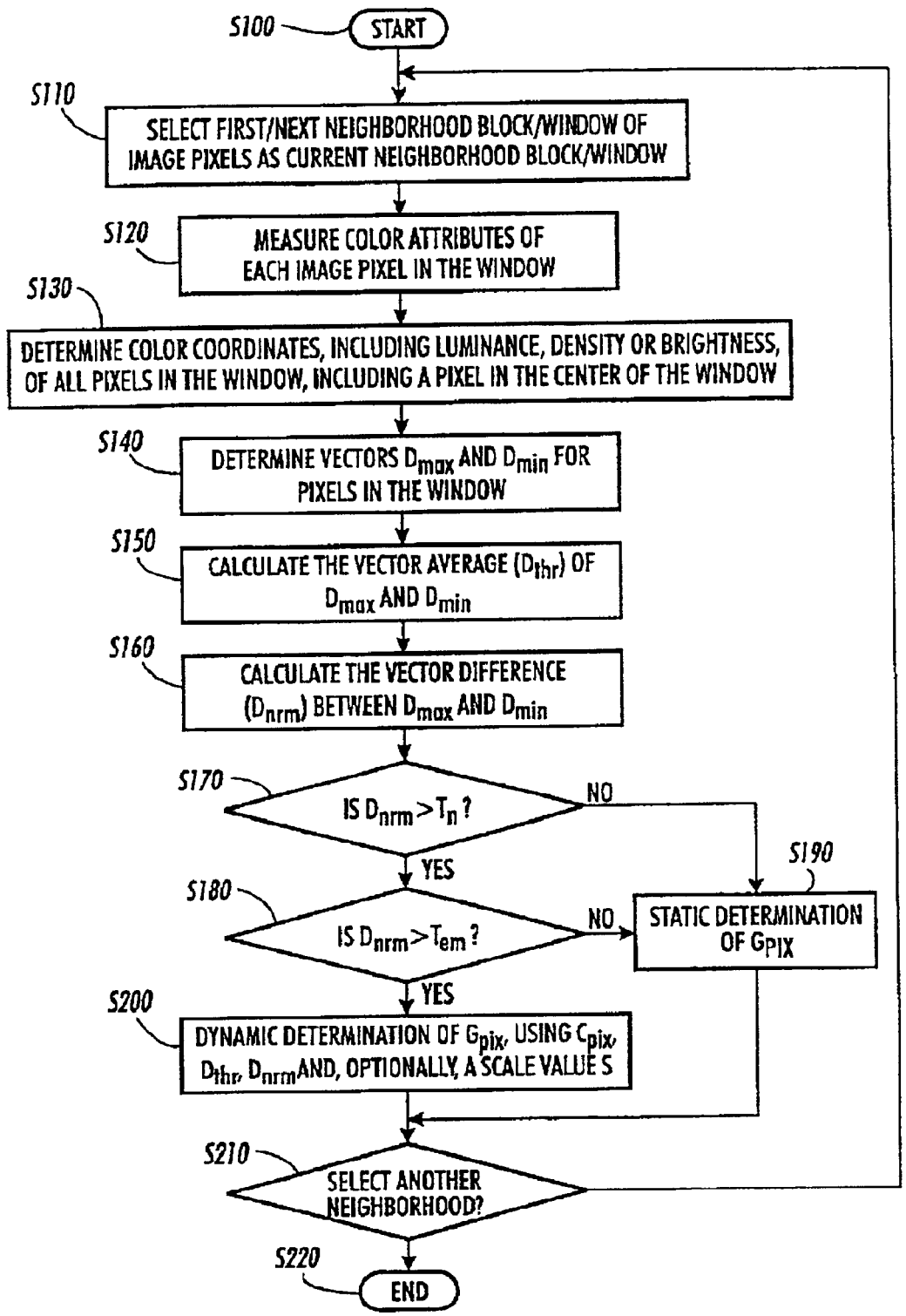
FIG. 4 is a flowchart depicting one exemplary embodiment of a method for combining color information a plurality of color channels and a threshold to form a high quality gray image according to this invention.

FIG. 4 is a flowchart outlining one exemplary embodiment of a method for combining color information a plurality of color channels and a threshold to form a high quality gray image according to this invention. As shown in FIG. 4, beginning in step S100, operation continues to step S110, where a first or next pixel in the image is selected as the current target pixel, and a window of image pixels surrounding the current target pixel is determined. Then, in step S120, the color attributes, such as, for example, the tristimulus values R, G and B, of each color image pixel in the current window are measured. Next, in step S130, color space coordinates, including luminance, brightness and/or optical density, of all pixels in the current window, including a center or target pixel $C_{pix}$, are determined from the measured color attributes.

Typically, such color spaces include those defined using the CIE L*,a*,b* coordinate system, the CIE uniform chromaticity scale (UCS) system, or another known color space, such as, for example, the CIE X,Y,Z system; the C,M,Y system; the C,M,Y,K system, the Y'Cb'Cr' system, Y*,u",v*; U*,V*,W*; S, θ, W*; C,M,Y; C,M,Y,K; Y'Cb'Cr; NTSC Y,I,Q; H,S,I; H,S,V; CIE R,G,B; and NTSC $R_N,G_N,B_N$ systems. Typically, in these systems, one of the coordinates corresponds to luminance, brightness and/or density. In the CIE L*,a*,b* system, L* represents luminance. In the CIE X,Y,Z system, Y represents luminance. Thus, the systems and methods of this invention obtain the luminance of each pixel in neighborhood defined by the window in the context of the given color space, i.e., in terms of not only luminance but also chromaticity. Operation then continues to step S140.

In step S140, the pixel value of the most luminant pixel in the current window is denoted $D_{max}$ and the pixel value of the least luminant pixel is denoted $D_{min}$. $D_{max}$ and $D_{min}$ are vectors with three or four color components. Moreover, for images with higher levels of noise, it may be desirable to preprocess the image pixels used to determine $D_{max}$ and $D_{min}$ by, for instance, blurring or smoothing. For simplicity, a three-component space will be described, although any number of vector components may be used. As described above, $D_{max}$ and $D_{min}$ are shown as vectors in the represented color space. Operation then continues to step S150.

In various exemplary embodiment that use a three-color component, each vector has an x component, a y component and a z component. Although the particular color space used is not important, some color spaces, such as, for example, CIE L*,a*,b*; Y'Cb'Cr'; and others discussed above, are convenient to use because the maximum and minimum pixel luminance can be found by only examining one of the three color components.

In step S150, the vector average, $D_{thr}$, of $D_{max}$ and $D_{min}$ is determined as:

$$D_{thr}=(D_{max}+D_{min})/2.$$

Next, in step S160, the vector difference, $D_{nrm}$, between $D_{max}$ and $D_{min}$ is determined as:

$$D_{nrm}=(D_{max}-D_{min}).$$

Then, in steps S170 and S180 determinations are made whether to use adaptive thresholding or static thresholding. The decision to use adaptive thresholding is made based on two tests. In step S170, the first test determines whether the luminance component of the difference vector $D_{nrm}$ is greater than some luminance noise threshold $T_n$. $T_n$ is an empirically determined parameter which may be determined in advance or dynamically during the thresholding process. If the luminance component of the difference vector $D_{nrm}$ is greater than a particular luminance noise threshold $T_n$, control proceeds to step S180. If not, control proceeds to step S190. In step S180, the second test determines whether the overall vector magnitude of $D_{nrm}$ exceeds some "estimated magnitude" threshold $T_{em}$. To simplify the second test, the estimated magnitude threshold may be approximated by the well known Euclidian difference or the Manhattan difference. The Manhattan distance estimate is the sum of the absolute values of the vector components. If the overall vector magnitude of $D_{nrm}$ exceeds some "estimated magnitude" threshold $T_{em}$, control proceeds to step S200. If not, control proceeds to step S190. If both tests are passed, i.e., if the determinations of both steps S170 and 180 are "yes," then control proceeds to step S200 where a dynamic determination of $G_{pix}$ is made based on adaptive thresholding is made. However, if either test fails, operation continues to step S190, where a $G_{pix}$ determination is made based on static thresholding. In step S190, $G_{PIX}$ is typically determined to be either a plus 1 or a minus 1.

In step S190, a static luminance threshold is subtracted from the luminance component of $C_{PIX}$ to produce $G_{PIX}$, In step S200, dynamic thresholding is active and the signed single component gray pixel value, $G_{PIX}$, is determined as:

$$G_{pix}=((C_{pix}-D_{thr})*D_{nrm})/S$$

where:

S is a predetermined scale value, such as, for example, 256 when 8-bit samples are used, which reduces the overall magnitude of $G_{pix}$ for convenient storage; and "*" is the vector dot product operator.

It is useful to remember that a dot product, also called an inner product, of two vectors is (1) the product of their magnitudes times the cosine of the angle between them or (2) the magnitude of a first vector times the projection of the other vector along the first vector.

This exemplary method determines the signed distance of $G_{pix}$ from the color space plane which contains $D_{thr}$ and to which $D_{nrm}$ is perpendicular. $G_{pix}$ is represented in FIG. 2 as the magnitude of the solid vector extending to the point $C_{pix}$ from the threshold plane that contains $D_{thr}$. That magnitude, and therefore $G_{pix}$, is the dot product of $(C_{pix}-D_{thr})$ and $D_{nrm}$. FIG. 2 shows these quantities, as well as the angle $\theta$ between $D_{nrm}$ and $(C_{pix}-D_{thr})$.

$G_{pix}$ is negative below the threshold plane and is positive above the threshold plane. Thus, zero can be used as a binarizing value of $G_{pix}$. Where the vector difference between $D_{max}$ and $D_{min}$ falls below some system noise threshold, $T_n$, or less than an estimate of an edge magnitude of difference $T_{em}$, the systems and methods of this invention fall back to using a static, single component thresholding. In this manner, the systems and methods according to this invention can avoid binarizing image noise.

Next, in step S210, a determination is made whether any other pixels in the image need to be analyzed. If so, operation returns to step S110. Otherwise, operation continues to step S220, where the method ends.

Figure 5:
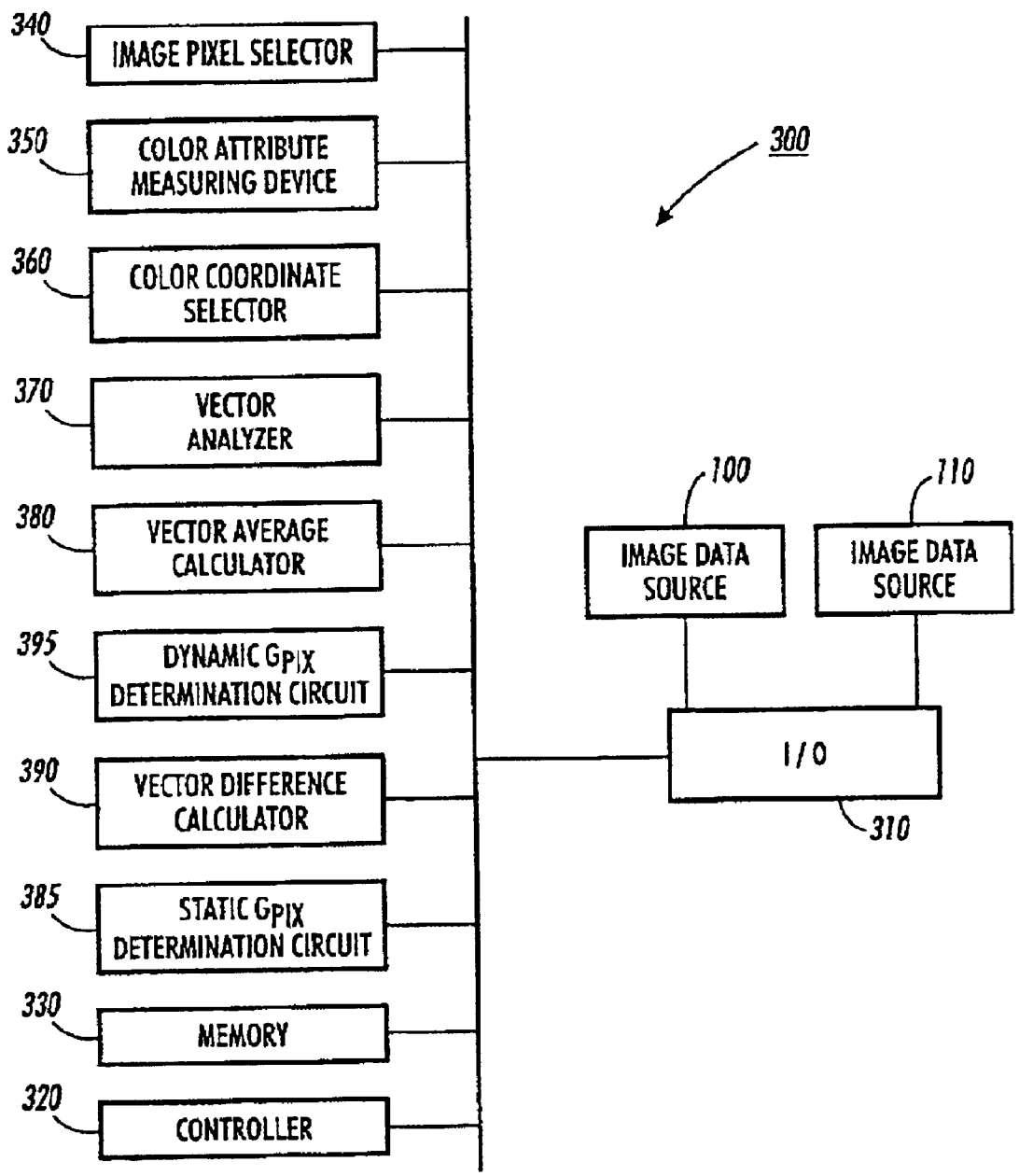
FIG. 5 depicts a first exemplary embodiment of a system that adaptively thresholds a pixel image.

FIG. 5 shows a first exemplary embodiment of a micro-adaptive color image thresholding system 300 according to this invention. As shown in FIG. 5, the a micro-adaptive color image thresholding system 300 includes an interface 310, a controller circuit or software routine or element 320, a memory 330, an image pixel selector circuit or software routine or element 340, a color attribute determining device or circuit or software routine or element 350, a color coordinate selector circuit or software routine or element 360, a vector analyzer circuit or software routine or element 370, a vector average circuit or software routine or element 380, a static $G_{PIX}$ determination circuit or software routine of element 385, a vector difference determining circuit or software routine or element 390, and a dynamic $G_{PIX}$ determination circuit or software routine or element 395. The system elements 300–395 are interconnected to each other by a bus or application programming interface (API) 200. The interface 310 interconnects an image date source 100 and an image data sink 110 with the system elements 320–395. In general, the image data source 100 can be any one of a number of different sources, such as a scanner, a digital copier, a facsimile device that is suitable for generating electronic image data, or a device suitable for storing and/or transmitting electronic image data, such as a client or server of a network, or the Internet, and especially the World Wide Web. The color measurement device 350, which may be integrated with the image data source 100, such as, for example, a facsimile machine or image scanner, measures the color attributes, such as tristimulus values of color image pixels.

The controller 320 controls the operation of the system elements 310 and 330–395. The color coordinate selector circuit or software routine or element 360 converts these tristimulus values to color coordinates, e.g., L*,a*, b* for each pixel, including a neighborhood center pixel. The vector analyzer circuit or software routine or element 370 determines vectors $D_{max}$ and $D_{min}$ for the neighborhood pixels. The vector determining circuit or software routine or element 350 determines the average of $D_{max}$ and $D_{min}$. The vector difference determining circuit or software routine or element 390 determines the difference between $D_{max}$ and $D_{min}$. The signal gray value determining circuit or software routine or element 395 determines a signed gray channel value and sets or changes the threshold accordingly.

Figure 6:
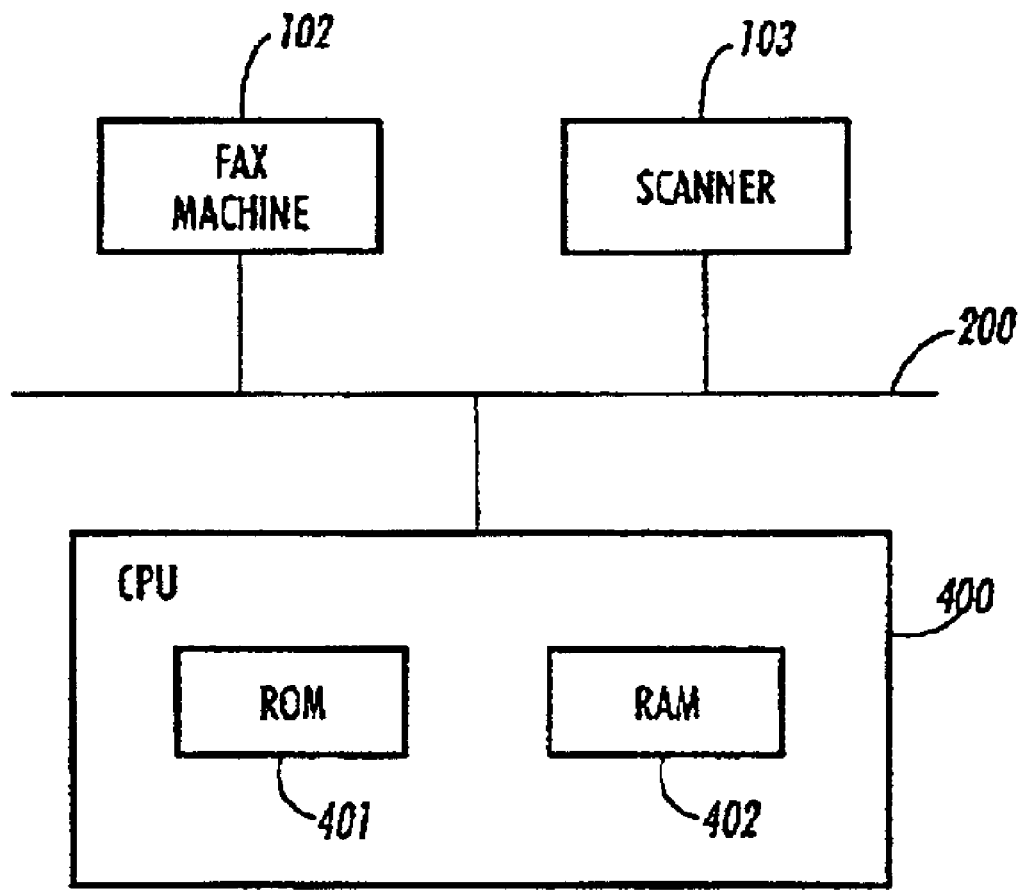
FIG. 6 depicts a second exemplary embodiment of a system that adaptively thresholds a pixel image.

FIG. 6 shows a second exemplary embodiment of a system according to this invention, as shown in FIG. 6, replaces each of the separate system elements 310–395, as shown in FIG. 5, with a central processing unit 400, having ROM memory 401 and RAM memory 402. As shown in FIG. 6, the image data source 100 can be implemented, for example, using one or both of a facsimile machine 102 and a scanner 104.

The micro-adaptive color image thresholding systems 300 and/or 400 according to this invention are preferably implemented on a programmed general purpose computer. However, the micro-adaptive color image thresholding systems 300 and/or 400 according to the invention can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIG. 4, can be used to implement a system according to this invention.

The memory elements 330, 401 and 402 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a writable or re-rewriteable optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

It should be understood that each of the micro-adaptive color image thresholding systems 300 and 400 shown in FIGS. 5 and 6, respectively, can be implemented as portions of a suitably programmed general purpose computer. Alternatively, each of the systems 300 and/or 400 shown in FIGS. 5 and 6, respectively, can be implemented as physically distinct hardware circuits within an ASIC, or using a FPGA, a PDL, a PLA or a PAL, or using discrete logic elements or discrete circuit elements. The particular form each of the circuits will take is a design choice and will be obvious and predictable to those skilled in the art.

Moreover, the micro-adaptive color image thresholding systems 300 and/or 400 can be implemented as software executing on a programmed general purpose computer, a special purpose computer, a microprocessor or the like. In this case, the micro-adaptive color image thresholding systems 300 and/or 400 can be implemented as a routine embedded in a printer driver, as a resource residing on a server, or the like. The micro-adaptive color image thresholding systems 300 and/or 400 can also be implemented by physically incorporating it into a software and/or hardware system, such as the hardware and software systems of a printer or a digital photocopier.

The methods and systems of this invention represent an improvement over the prior art thresholding methods and systems mentioned in the Background of the Invention section, above. Various exemplary embodiments of the methods and systems of this invention produce a smooth, continuous function around zero which incorporates contributions from all color components of the pixel image and continuously adjusts the signed weights of those contributions based on the correlation of each to pixel luminance.

Prior thresholding systems and methods, including those discussed above, were based solely on achromatic or gray scale luminance, whereas the thresholding systems and methods of this invention take into consideration one or more chromaticity characteristics, such as for example, the hue or color family, and/or saturation or chroma, of the image pixels. This is especially important in image areas where image contrast is expressed mostly as a difference in the saturation, i.e., chroma, or the color family, i.e., hue between adjacent pixels.

Systems and methods of thresholding which include only using luminance or some approximation to luminance, such as Y or G, as the gray reference can miss contrast differences or changes expressed mostly as saturation or hue differences or changes.

While the invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method of forming a gray scale image having a plurality of image pixels, comprising:
   selecting a neighborhood of image pixels;
   determining color coordinates, including at least one of image pixel luminance, density and brightness, of the image pixels in the neighborhood;
   determining a minimum vector and maximum vector for the pixels of the selected neighborhood of the color coordinate which corresponds to one of image pixel luminance, density and brightness;
   determining a vector average of the maximum and minimum vectors;
   determining a vector difference between the maximum and minimum vectors; and
   determining a signed single component pixel using the maximum and minimum vectors, the determined vector average and the determined vector difference; and
   determining a threshold based on the signed single component gray pixel.

2. The method according to claim 1, further comprising:
   determining system noise; and
   testing whether the vector difference is greater than the determined system noise and minimum feature contract limits.

3. The method of claim 2, further comprising applying static, single component thresholding if the vector difference is not greater than system noise.

4. The method of claim 1, wherein the color coordinates are specified in one of CIE X,Y,Z; L*,a*,b*; Y*,u'',v*; U*,V*,W*; S, θ, W*; C,M,Y; C,M,Y,K; Y'Cb'Cr; NTSC Y,I,Q; H,S,I; H,S,V; CIE R,G,B; and NTSC $R_N,G_N,B_N$ color coordinate systems.

5. A system for forming a gray scale image comprising image pixels, comprising:
   a that selects a neighborhood of image pixels;
   a color coordinate determiner that determines color coordinates, including at least one of image pixel luminance, density and brightness of the image pixels in the neighborhood;
   a vector analyzer that determines a minimum vector and a maximum vector for the pixels in the selected neighborhood of the color coordinate which corresponds to one of image pixel luminance, density and brightness;
   a vector averager that determines a vector average of the maximum and minimum vectors;
   a vector difference determiner that determines a vector difference between the maximum and minimum vectors;
   a gray value determiner that determines a signed single component gray pixel using the maximum and minimum vectors, that determines vector average and the determined vector difference; and
   a threshold adapter that determines a threshold based on the signed single-component gray pixel.

6. The method according to claim 5, further comprising:
   a noise analyzer that determines system noise; and
   a comparator that compares the vector difference luminance to the system noise and an estimate of the vector difference magnitude to a minimum feature contrast.

7. The system of claim 5, further comprising a static thresholding unit applied when the comparator that indicates that the vector difference is not greater than the system noise.

8. A method of determining a threshold for thresholding color image values, comprising:
   selecting a neighborhood of image pixels;
   determining color coordinates, including at least one of image pixel luminance, density and brightness of the image pixels in the neighborhood;
   determining a minimum and maximum vectors for the pixels of the selected neighborhood of the color coordinate which corresponds to one of image pixel luminance, density and brightness; and
   determining a vector average of the maximum and minimum vectors;
   determining a vector difference between the dependent maximum and minimum vectors; and
   determining a signed single-component gray pixel using the maximum and minimum vectors, the determined vector average and the determined vector difference; and
   determining a threshold based on the signed single-component gray pixel.

9. A system for determining a threshold for thresholding color image pixels, comprising:
   a window usable to select a neighborhood of image pixels;
   a color coordinate determiner that determines color coordinates, including at least one of image pixel luminance, density and brightness of the image pixels in the neighborhood;
   a vector analyzer that determines the dependent minimum and a maximum vector for the neighborhood pixels of the color coordinate which corresponds to one of image pixel luminance, density and brightness;
   a computer that determines a signed single-component gray pixel using the maximum and minimum vectors, the determined vector average and the determined vector difference; and
   a threshold adapter to determine the threshold based on the signed single-component gray pixel.

* * * * *